(12) United States Patent
Burkhardtsmaier et al.

(10) Patent No.: US 9,090,224 B2
(45) Date of Patent: Jul. 28, 2015

(54) BELT-STRAP ARRESTER

(75) Inventors: Guenter Burkhardtsmaier, Goeggingen (DE); Maike Seiler, Essingen (DE)

(73) Assignee: TRW AUTOMOTIVE ELECTRONICS & COMPONENTS GMBH, Alfdorf (DE)

( * ) Notice: Subject to any disclaimer, the term of this patent is extended or adjusted under 35 U.S.C. 154(b) by 0 days.

(21) Appl. No.: 13/982,765

(22) PCT Filed: Jan. 24, 2012

(86) PCT No.: PCT/EP2012/000295
§ 371 (c)(1),
(2), (4) Date: Aug. 23, 2013

(87) PCT Pub. No.: WO2012/110192
PCT Pub. Date: Aug. 23, 2012

(65) Prior Publication Data
US 2013/0328296 A1    Dec. 12, 2013

(30) Foreign Application Priority Data
Feb. 16, 2011   (DE) .......................... 10 2011 011 425

(51) Int. Cl.
| B60R 22/26 | (2006.01) |
| B60R 22/03 | (2006.01) |
| B60R 22/18 | (2006.01) |
| B60R 22/30 | (2006.01) |

(52) U.S. Cl.
CPC ................. B60R 22/26 (2013.01); B60R 22/03 (2013.01); B60R 22/18 (2013.01); B60R 22/30 (2013.01)

(58) Field of Classification Search
CPC ................................ B60R 22/30; B60R 22/03
USPC ................................. 280/801.1, 808; 297/468
See application file for complete search history.

(56) References Cited

U.S. PATENT DOCUMENTS

| 3,856,327 | A | * | 12/1974 | Otani ........................... 280/802 |
| 4,629,214 | A | * | 12/1986 | Fohl ............................. 280/808 |
| 4,648,625 | A | * | 3/1987 | Lynch ........................... 280/808 |
| 4,741,557 | A | * | 5/1988 | Jambor et al. ............. 280/801.2 |
| 5,393,097 | A | * | 2/1995 | Townsend ................. 280/801.1 |
| 5,505,491 | A | * | 4/1996 | Townsend ................. 280/801.1 |
| 5,538,283 | A | * | 7/1996 | Townsend ................. 280/801.1 |
| 6,193,275 | B1 | * | 2/2001 | Knox ........................... 280/808 |
| 6,267,409 | B1 | * | 7/2001 | Townsend et al. ......... 280/801.1 |
| 6,308,986 | B1 | * | 10/2001 | Townsend et al. ........... 280/807 |
| 8,573,648 | B2 | * | 11/2013 | Park et al. ................. 280/801.2 |
| 8,590,658 | B2 | * | 11/2013 | Harada et al. ................ 180/268 |
| 2011/0001310 | A1 | | 1/2011 | Fruehauf et al. |

FOREIGN PATENT DOCUMENTS

| DE | 102007062590 | 5/2009 |
| EP | 0188875 | 7/1986 |
| WO | 00/21801 | 4/2000 |

\* cited by examiner

*Primary Examiner* — Nicole Verley
(74) *Attorney, Agent, or Firm* — Tarolli, Sundheim, Covell & Tummino LLP

(57) ABSTRACT

A webbing catcher (10) for a vehicle seat belt (30) comprises an adjusting portion (12) pivoting between a release position and a retaining position and a retaining portion (18) arranged at the adjusting portion (12) and having a free end (20) over which the seat belt (30) can be put.

19 Claims, 4 Drawing Sheets

BELT-STRAP ARRESTER

RELATED APPLICATIONS

This application corresponds to PCT/EP2012/000295, filed Jan. 24, 2012, which claims the benefit of German Application No. 10 2011 011 425.4, filed Feb. 16, 2011, the subject matter, of which are incorporated herein by reference in their entirety.

BACKGROUND OF THE INVENTION

The invention relates to a webbing catcher for a vehicle seat belt. Moreover the invention relates to a seat belt system comprising a seat belt and a webbing catcher of this type.

Vehicle seat belts are used to restrain a vehicle occupant in the case of sudden impact of the vehicle. Previous three-point seat belt systems include a belt fitting on which the seat belt is held in a way fixed to the vehicle, a belt retractor onto which the seat belt can be wound as well as a belt buckle to which the belt can be fixed by a plug-in tongue movably supported on the belt. The seat belt is fastened by guiding the seat belt around the vehicle occupant and fixing it by means of the plug-in tongue in the belt buckle.

The belt buckles frequently have the drawback, however, that they are not easy to reach and that it is difficult to insert the plug-in tongue into the belt buckle for example when the occupant wears gloves in winter, which in practice results in a decrease of the belt wearing rate. Therefore from the state of the art e.g. belt feeders are known that move the belt buckle into a comfortable position which is better reachable for the driver. After fastening the seat belt the belt buckle is moved back into an operating position in which the belt buckle does not restrict the freedom of movement of the vehicle occupant.

The motion sequence when fastening the seat belt can be substantially divided into three sections of movement. In the first section of movement the belt webbing is searched for and seized in the area of the plug-in tongue and the plug-in tongue is searched for and seized. Subsequently the belt webbing and the plug-in tongue are pulled around in front of the occupant's body. In the third section of movement the plug-in tongue is inserted into the belt buckle. In contrast to the second section of movement, i.e. guiding the webbing around, the first and third sections of movement take place in a limited space due to the defined positions of the belt components. These sections of movement therefore are highly vehicle-specific.

SUMMARY OF THE INVENTION

It is the object of the invention to provide a vehicle seat belt system which permits rapid and comfortable fastening and fixing of the seat belt and facilitates the afore-described first and third sections of movement.

According to the invention, a webbing catcher for a vehicle seat belt is provided comprising an adjusting portion adjustable between an input or release position and a retaining position and a retaining portion arranged at the adjusting portion and having a free end over which the seat belt can be put. The invention is based on the consideration to replace the belt buckle and the plug-in tongue mounted on the belt webbing with a pivotal webbing catcher fixed to the vehicle onto which webbing catcher a loop of the webbing can be threaded and can be fixed to the same. At a release position the free end of the webbing catcher is at a position where it can easily be reached by the vehicle occupant so that the seat belt can be easily put around the retaining portion. Subsequently the belt catcher is moved into the retaining position in which the seat belt is safely anchored at the retaining portion and cannot slip off the latter. Fastening the seat belt is substantially facilitated by such webbing catcher. On the one hand, the belt catcher as a fastening device for the seat belt can be reached by far more easily and conveniently. On the other hand, the operation is by far simpler, as it is merely necessary to thread the seat belt onto the retaining portion. It is not necessary to search for the plug-in tongue displaced at the belt which is complicated in conventional belt systems and to insert the plug-in tongue into the belt buckle which is time-consuming, thereby the belting speed and the belting convenience being definitely increased. In a three-point seat belt, for example, the retaining portion serves just as the plug-in tongue of a conventional seat belt merely as deflection for the seat belt to which the seat belt is not fixed. Thus belt tensioning is still possible via a belt retractor or a mounting point of the seat belt at the vehicle body. Even when the seating position is varied, belt webbing extension is easily possible.

The webbing catcher can be in the form of a pivotal component pivoting about an axis substantially inclined transversely to the longitudinal vehicle axis. Said pivot axis can also be inclined so as to adapt to the vehicle geometry.

The webbing catcher can also be moved in a translational or telescopic and/or rotational manner. A possible embodiment can include, for instance, a telescopic portion at the end of which a pivotal or twisting retaining portion is formed.

An especially simple and inexpensive variant of the webbing catcher is made of a one-piece retaining bracket in which the adjusting portion, the retaining portion and a retaining arm are transformed into each other.

At the free end of the retaining arm a thickening can be additionally provided which prevents the seat belt from sliding off in the release position. Such thickening facilitates fastening of the seat belt, because the belt can no longer slip off after being threaded onto the retaining arm and thus is safely retained. It is not required to actively retain or fix the seat belt at the retaining arm until the latter has reached the retaining position. The vehicle occupant can just put the belt over the retaining arm and then move the webbing catcher into the retaining position either manually or by an additional drive.

Upon swiveling the adjusting portion, the seat belt slides along the retaining arm to said retaining portion. The retaining portion is formed so that in the retaining position of the webbing catcher the seat belt is safely supported on the latter and cannot slip in the direction of the retaining arm or toward the pivot point. For this purpose, the retaining portion can be arc-shaped, for instance, so that even in the case of different seating positions or when the vehicle occupant moves, an ideal positioning of the seat belt is ensured and turn-over of the belt is excluded. In order to ensure sliding of the seat belt along the retaining arm, it is also imaginable that the retaining arm or the adjusting portion is arc-shaped.

It is also possible that the retaining arm has a helical shape, i.e. the radius of the retaining arm decreases from the free end toward the retaining portion and toward the adjusting portion, whereby additionally a tensioning effect of the seat belt is possible by the distance between the seat belt and the pivot point of the pivoting arm decreasing during pivoting, for example in order to eliminate belt slack.

The retaining arm can also have an elongate design, thereby ensuring good reachability of the retaining arm even in the case of different seating positions or vehicle occupants of different size.

The webbing catcher can be adjusted e.g. manually in the retaining position and can be locked in the same. Preferably a driving device is provided, however, that is adapted to adjust the webbing catcher between the release position and the retaining position.

In accordance with the invention, further a seat belt system comprising a seat belt is provided which is fixed to the vehicle at one end and mounted on a belt retractor at the other end. The seat belt system moreover includes a webbing catcher according to the invention, wherein the seat belt can be pushed with a portion located between the two ends over the retaining portion so as to be anchored there when the webbing catcher is in the retaining position. The seat belt is not fixed to the retaining portion but is merely deflected by the same. That is to say, the seat belt can be moved or shifted in the longitudinal direction of the belt webbing about the retaining portion, for example when the seating position of the vehicle occupant is varied or for eliminating a belt slack. Consequently, the seat belt system according to the invention has no functional drawbacks compared to a conventional seat belt system comprising a belt buckle and can completely replace the latter. However, the operation of the seat belt system is substantially facilitated so that, for example, also easy and quick operation for occupants wearing gloves or for persons with physical limitations is possible.

In an especially advantageous manner, such seat belt system can dispense with additional components to be threaded onto the belt webbing between the belt end fitting and the belt retractor, especially with a plug-in tongue.

BRIEF DESCRIPTION OF THE DRAWINGS

Further advantages and features become evident from the following description in connection with the enclosed drawings in which.

DESCRIPTION OF EXEMPLARY EMBODIMENTS

Figure 1:
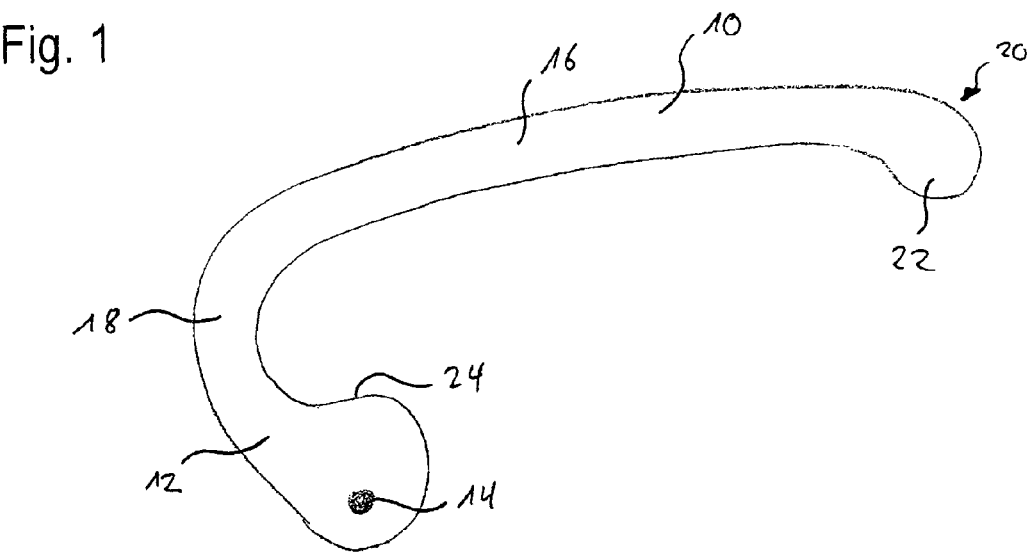
FIG. 1 shows a webbing catcher according to the invention.
Figure 2:
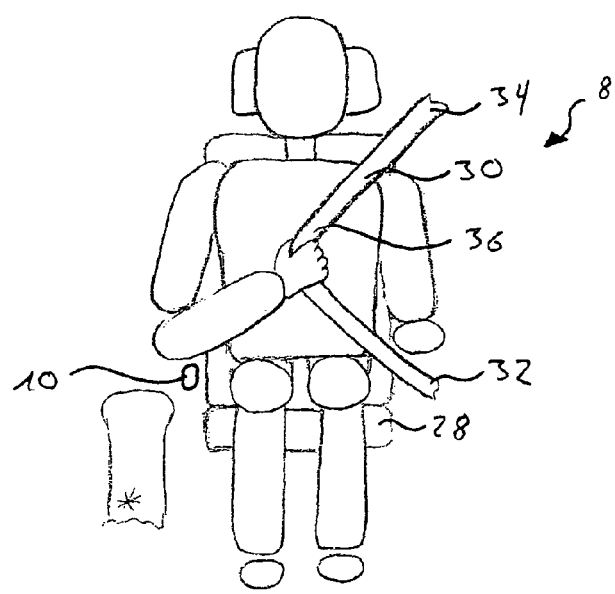
FIG. 2 shows a seat belt system according to the invention in the release position of the webbing catcher.
Figure 3:
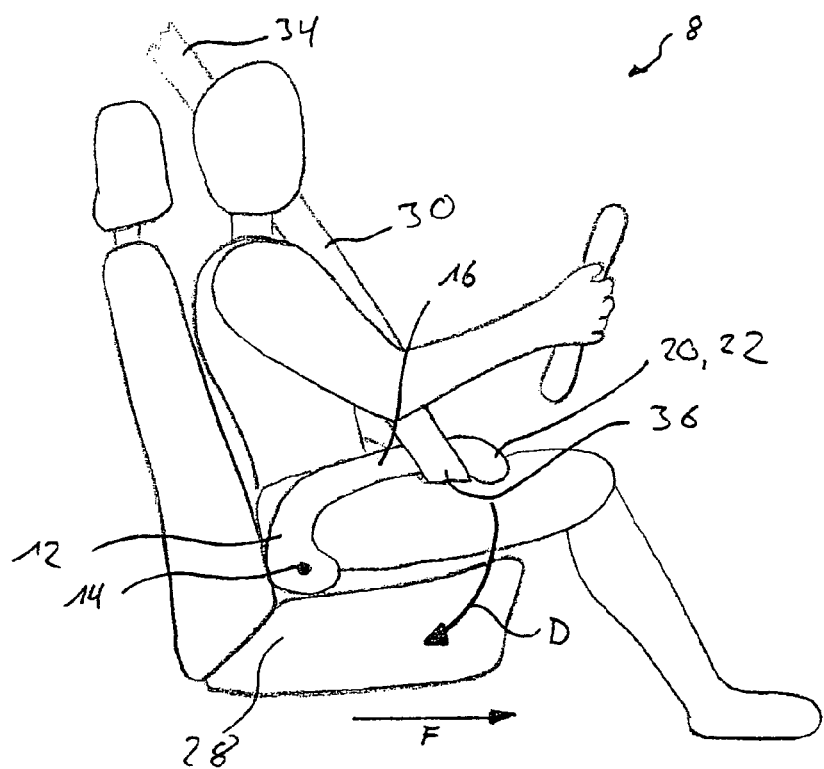
FIG. 3 shows the seat belt system from FIG. 2 comprising a seat belt put around the retaining portion.

FIG. 1 shows a webbing catcher 10 for a vehicle seat belt system 8, as it is illustrated in FIGS. 2 to 6. The seat belt system 8 is a conventional three-point seat belt system, as can be seen in FIG. 3, comprising a seat belt 30 held in a way fixed to the vehicle by a first end 32 and a second end 34, at the second end 34 a belt retractor being provided by which the seat belt 30 can be wound. The webbing catcher 10 in this case constitutes the third mounting point at which the seat belt 30 is fixed, as will be shown hereinafter.

The webbing catcher 10 has an adjusting portion 12 pivoted about a pivot point 14 as well as a retaining arm 16. Between the adjusting portion 12 and the retaining arm 16 there is provided a retaining portion 18 to which a portion 36 of the seat belt 30 can be adjacent, as will be explained hereinafter. The retaining arm 16 has a free end 20 at which a thickening 22 is provided. The retaining portion 18 is limited by a belt stop 24 toward the adjusting portion 12.

In this case the webbing catcher 10 is pivoted at the vehicle seat 28 with the pivot point 14. It is also imaginable, however, that the webbing catcher 10 is supported on a mounting point fixed to the vehicle.

Figure 4:
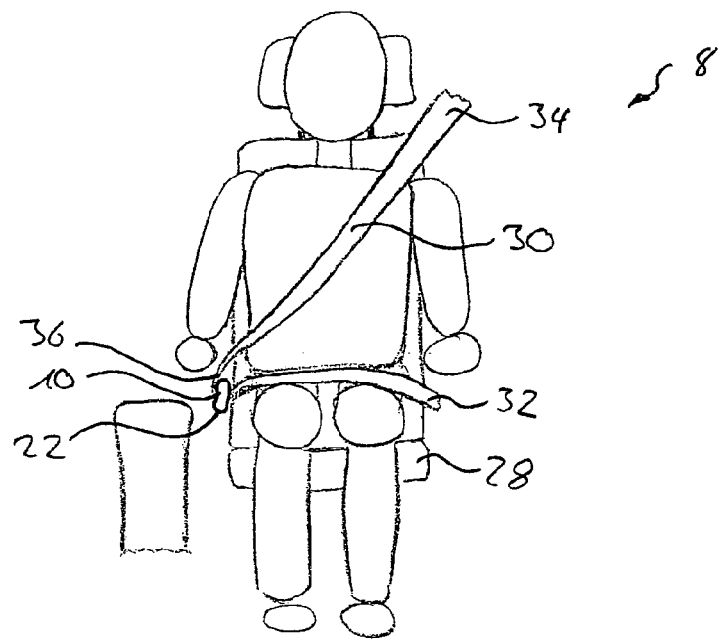
FIG. 4 shows a second view of the seat belt system from FIG. 3.

In FIGS. 2 to 4 the webbing catcher 10 is shown in a release position. The free end 20 of the retaining arm 16 at this position in the direction of travel F points obliquely upwards in the direction of the vehicle compartment so that the free end 20 is arranged above the vehicle seat (FIG. 3). At this position the retaining arm 16 or the free end 20 of the retaining arm 16, resp., is positioned so that it can be easily reached by the vehicle occupant (see also FIG. 2).

When the retaining arm is in the release position, the vehicle occupant can seize the seat belt (FIG. 2) and put it with a portion 36 located between the two ends 32, 34 around the retaining arm 16 (FIGS. 3 and 4).

Figure 5:
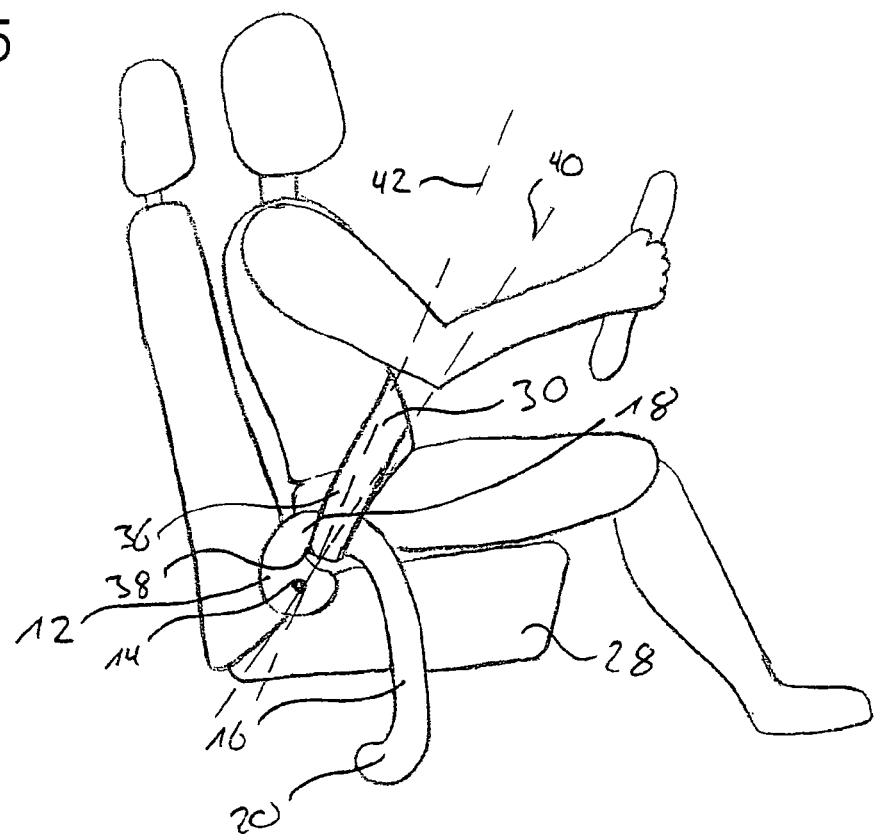
FIG. 5 shows the seat belt system from FIG. 2 with fastened seat belt and the webbing catcher in the retaining position.
Figure 6:
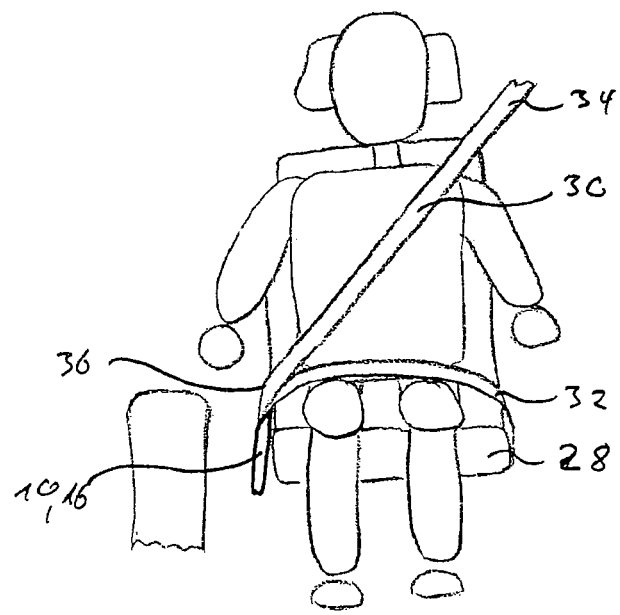
FIG. 6 shows a second view of the seat belt system from FIG. 5.
Figure 7:
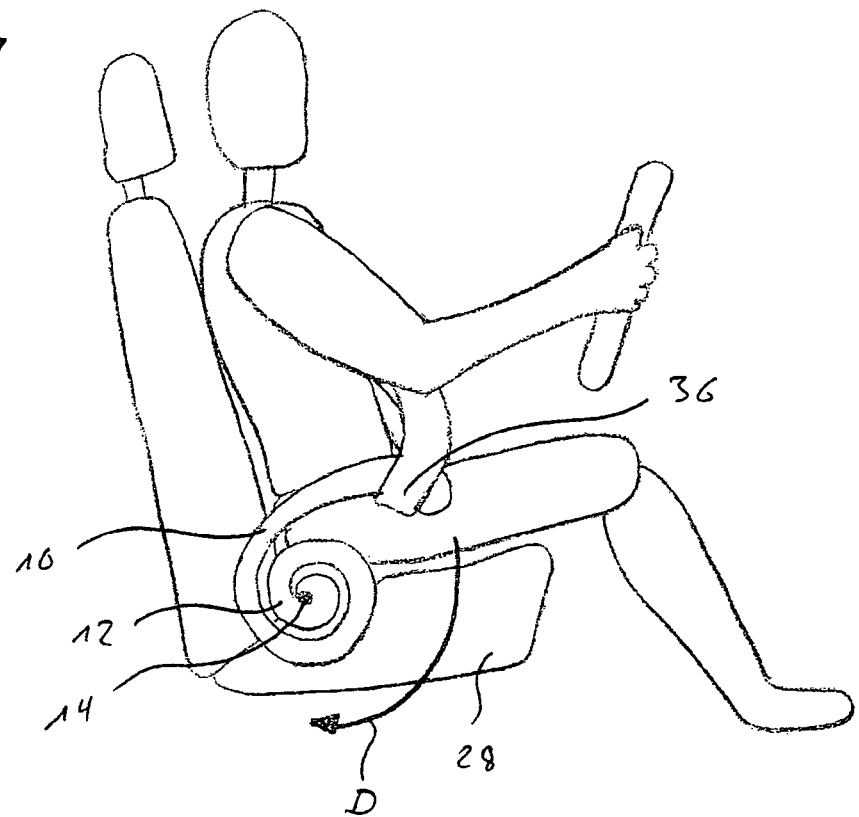
FIG. 7 shows a second embodiment of a seat belt system according to the invention.

After having put the seat belt 30 around the retaining arm, the webbing catcher 10 is moved into a retaining position, as illustrated in FIGS. 5 and 6. In the embodiment shown here, for this purpose the webbing catcher 10 is swiveled downwards in the direction of rotation D by about 90°.

During swiveling into the retaining position the portion 36 of the seat belt 30 slides along the retaining arm 16 toward the retaining portion 18 due to the arc-shaped retaining arm 16 (FIG. 5).

As is visible especially in FIG. 5, the contact surface 38 to which the seat belt 30 is adjacent at the retaining portion 18 is configured so that the seat belt 30 is adjacent to the full surface of the retaining portion with the portion 36. In the direction of the seat belt, the latter is not fixed to the retaining portion but is merely deflected by the webbing catcher 10 so that the seat belt can be shifted along the webbing catcher for instance for belt tensioning or when the seating position is varied.

The lines of action of the tensile forces of the seat belt 30 at the retaining portion 18 are shown by the broken lines 40, 42. As is visible in FIG. 5, said lines of action extend substantially perpendicularly to the contact surface 38. In this way the seat belt 30 is pulled against the retaining portion 18. Since no forces act in the direction of the retaining arm 16, the seat belt 30 is not displaced along the retaining arm 16 so that the belt is prevented from turning over, for example. Moreover, the stop 24 prevents the seat belt 30 from slipping.

In a case of restraint, the seat belt system 8 shown here functions like a conventional three-point seat belt. Belt tensioning can be performed by the two ends 32, 34 of the seat belt 30, while the portion 36 of the seat belt 30 is safely held at the webbing catcher 10 or the seat belt 30 is deflected by the webbing catcher 10. As the lines of action 40, 42 of the webbing forces extend near the pivot point 14, as is visible in FIG. 5, moreover no transfer of high moment loads by the seat belt to the webbing catcher 10 is possible so that the webbing catcher 10 can be fixed in the retaining position with a relatively low retaining force.

Fastening the seat belt 30 with the seat belt system shown here is by far easier and quicker than with a conventional seat belt system. The frequently time-consuming search for the belt buckle and, resp., the previously used plug-in tongue movably supported on the seat belt as well as the insertion of the plug-in tongue into the belt buckle is dispensed with.

As is evident especially in FIG. 5, the webbing catcher 10 is moreover swiveled in the retaining position so that it is outside the radius of movement of the vehicle occupant so that the freedom of movement of the vehicle occupant is not restricted.

The radius of the retaining arm with respect to the pivot point 14 decreases toward the retaining portion 18. In this way, the seat belt is additionally pulled in the direction of the pivot point when the webbing catcher is swiveled into the retaining position. After fastening the seat belt 30, in addition the seat belt 30 is thus tensioned, whereby the latter is adjacent to the vehicle occupant.

As is visible especially in FIG. 3, the seat belt 30 cannot slip off the retaining arm 16 even in the release position. On the one hand, this is ensured by the fact that the free ends 34, 32 of the seat belt 30 are located, viewed in the direction of travel F, behind the pivot point 14 of the webbing catcher 10, while the retaining arm 16 is located ahead of the pivot point 14, viewed in the direction of travel F. Due to the tensile force exerted on the seat belt 30 by the belt retractor, the portion 36 is pulled onto the retaining arm 16 in the direction of the retaining portion 18 against the direction of travel F. Moreover, the seat belt 30 is prevented from slipping off by the thickening 22 at the free end 20. Consequently, it is only possible to pull the seat belt 30 off the retaining arm when the seat belt 30 is further extended.

The webbing catcher 10 can be shifted manually, for example, into the retaining position. It is also imaginable, however, that this is performed via a drive activated after threading the seat belt 30 onto the retaining arm 16.

A second embodiment of a seat belt system 8 according to the invention is shown in FIG. 6. The webbing catcher differs from the previously illustrated webbing catcher merely by the fact that in this case the retaining arm 16 has a helical shape, thereby permitting, where appropriate, an adaptation to the seating position or an additional belt tensioning due to the continuously decreasing radius of the inner surface.

The invention claimed is:

1. A seat belt system (8) for a vehicle comprising
a seat belt (30) having a first end (32) fixed to the vehicle and a second end (34) mounted on a belt retractor, and
a webbing catcher (10) having an adjusting portion (12) adjustable between a release position and a retaining position, and a retaining portion (18) including a retaining arm (16) arranged at the adjusting portion (12) and having a free end (20) over which the seat belt (30) can extend,
wherein the seat belt (30) can be pushed over the retaining arm (16) with a portion (36) located between the first and second ends (32, 34) so that the seat belt (30) is anchored to the retaining arm (16) when the webbing catcher (10) is in the retaining position, wherein between the belt retractor and the first end (32) fixed to the vehicle the seat belt (30) is free of a plug-in tongue.

2. The seat belt system according to claim 1, wherein the adjusting portion (12) is pivoting.

3. The seat belt system according to claim 1, wherein the adjusting portion (12) is translationally adjustable.

4. The seat belt system according to claim 1, wherein the retaining portion (18) is movable in addition to the adjusting portion (12).

5. The seat belt system according to claim 1, wherein the webbing catcher (10) is in the form of a bracket including the adjusting portion (12), the retaining portion (18), and the retaining arm (16).

6. The seat belt system according to claim 1, wherein the retaining arm (16) has a thickening (22) provided at the free end (20).

7. The seat belt system according to claim 1, wherein the retaining arm (16) has a helical shape.

8. The seat belt system according to claim 1, wherein a driving device is provided which is capable of pivoting the webbing catcher (10) between the release position and the retaining position.

9. A webbing catcher for a vehicle seat belt comprising:
an adjusting portion adjustable between a release position and a retaining position; and
a retaining portion including a retaining arm extending along a centerline from the adjusting portion and having a free end for receiving the seat belt such that the seat belt extends circumferentially about the centerline of the retaining arm.

10. The webbing catcher (10) according to claim 9, wherein said webbing catcher (10) constitutes a mounting point at which the seat belt (30) is deflected.

11. The webbing catcher according to claim 9, wherein the adjusting portion is pivoting.

12. The webbing catcher according to claim 9, wherein the adjusting portion is translationally adjustable.

13. The webbing catcher according to claim 9, wherein the retaining portion is movable in addition to the adjusting portion.

14. The webbing catcher according to claim 9, wherein the webbing catcher (10) is in the form of a bracket including the adjusting portion (12), the retaining portion (18), and a retaining arm (16).

15. The webbing catcher according to claim 9, wherein the retaining portion (18) includes a retaining arm (16) having a thickening (22) provided at the free end (20).

16. The webbing catcher according to claim 9, wherein the retaining arm (16) has a helical shape.

17. The webbing catcher according to claim 9, wherein a driving device is provided which is capable of pivoting the webbing catcher (10) between the release position and the retaining position.

18. A seat belt system (8) comprising the seat belt (30) arranged in a way fixed to the vehicle at the first end (32) and mounted on a belt retractor on the second end (34), and comprising the webbing catcher (10) according to claim 9, wherein the seat belt (30) can be pushed over a retaining arm (16) with a portion (36) located between the two ends (32, 34) so that the seat belt (30) is anchored to the retaining arm (16) when the webbing catcher (10) is in the retaining position.

19. The webbing catcher according to claim 9, wherein the seat belt moves along the retaining portion toward the adjusting portion as the adjusting portion moves from the release position toward the retaining position and the seat belt extends circumferentially about the centerline of the retaining arm.

* * * * *